United States Patent
Orr et al.

(10) Patent No.: US 6,365,901 B1
(45) Date of Patent: Apr. 2, 2002

(54) RELATING TO MONITORING ION SOURCES

(75) Inventors: Christopher Henry Orr; Craig Janson Luff; Thomas Dockray, all of Calderbridge (GB); Duncan Whittemore Macarthur; John Alan Bounds, both of Los Alamos, NM (US)

(73) Assignees: British Nuclear Fuels PLC, Cheshire (GB); The Regents of the University of California, The, Oakland, CA (US)

( * ) Notice: Subject to any disclaimer, the term of this patent is extended or adjusted under 35 U.S.C. 154(b) by 0 days.

(21) Appl. No.: 09/307,222

(22) Filed: May 7, 1999

(30) Foreign Application Priority Data

May 8, 1998 (GB) .............................. 9809742

(51) Int. Cl.[7] .................................. G01T 1/18
(52) U.S. Cl. ...................... 250/380; 250/394; 250/376
(58) Field of Search ................ 250/380, 394, 250/376

(56) References Cited

U.S. PATENT DOCUMENTS

| | | | |
|---|---|---|---|
| 4,814,608 A | 3/1989 | Dempsey et al. | 250/253 |
| 4,853,536 A | 8/1989 | Dempsey et al. | 250/253 |
| 4,992,658 A | 2/1991 | Ramsey et al. | 250/253 |
| 5,008,540 A | 4/1991 | Dempsey | 250/336.1 |
| 5,055,674 A | 10/1991 | Kotrappa | 250/255 |
| 5,059,803 A | 10/1991 | Kronenberg | 250/385.1 |
| 5,107,108 A | 4/1992 | Ramsey et al. | 250/253 |
| 5,126,567 A | 6/1992 | Dempsey et al. | 250/336.1 |
| 5,128,540 A | 7/1992 | Stieff | 250/255 |
| 5,184,019 A | 2/1993 | MacArthur et al. | 250/380 |
| 5,187,370 A | 2/1993 | MacArthur et al. | 250/379 |
| 5,194,737 A | 3/1993 | MacArthur et al. | 250/382 |
| 5,281,824 A | 1/1994 | MacArthur et al. | 250/380 |
| 5,311,025 A | 5/1994 | MacArthur et al. | 250/374 |
| 5,371,363 A | * 12/1994 | Lilimpakis | 250/394 |
| 5,514,872 A | 5/1996 | Bolton et al. | 250/380 |
| 5,525,804 A | 6/1996 | MacArthur et al. | 250/374 |
| 5,550,381 A | 8/1996 | Bolton et al. | 250/380 |
| 5,663,567 A | 9/1997 | Steadman et al. | 250/382 |
| 5,679,958 A | 10/1997 | MacArthur | 250/382 |
| 5,877,502 A | 3/1999 | Koster et al. | 250/382 |

FOREIGN PATENT DOCUMENTS

WO    WO 98/38531    9/1998    .................. 1/185

* cited by examiner

*Primary Examiner*—Constantine Hannaher
*Assistant Examiner*—Andrew Israel
(74) *Attorney, Agent, or Firm*—Workman, Nydegger & Seeley

(57) ABSTRACT

The apparatus and method provide techniques for monitoring the position on alpha contamination in or on items or locations. The technique is particularly applicable to pipes, conduits and other locations to which access is difficult. The technique uses indirect monitoring of alpha emissions by detecting ions generated by the alpha emissions. The medium containing the ions is moved in a controlled manner frog in proximity with the item or location to the detecting unit and the signals achieved over time are used to generate alpha source position information.

19 Claims, 4 Drawing Sheets

RELATING TO MONITORING ION SOURCES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of CRADA No. LA96C10298 and Contract No. W-7405-ENG-36 awarded by the U.S. Department of Energy.

The present invention concerns improvements in and relating to monitoring and/or detecting and particularly, but not exclusively, to monitoring items such as pipes, for alpha source contamination.

Any item which passes time within the active area of a nuclear facility may become contaminated by radioactive material from within that area. As a result, before the item can be removed and subsequently re-used, disposed of or recycled, its potential contamination needs to be evaluated.

The absence of contamination may allow an item to be re-released. The higher grade of waste items are categorised as, the greater the storage/disposal costs which apply to their decommissioning.

It is therefore important to check the level of contamination in order to appropriately and cost effectively dispose of the item.

Detection and monitoring of alpha contamination of such items presents a number of difficulties, principally due to the short distance over which alpha particles can be detected. Alpha particles are stopped by tens of micrometers of solid material and within a few centimetres in air. Detectors further away in these distances cannot detect the alpha contamination.

In certain scenarios this, therefore, makes the detection of the alpha contamination very difficult, calling for close proximity scanning of the article with a detector.

In other scenarios, such detection is physically impossible as the inside surfaces of, for example, pipes, scaffolding and ducts are simply not accessible to such detectors and yet the detectors cannot monitor the alpha contamination through the walls of such items.

With any it can be useful to be able to locate the position of a source of contamination. Such information may allow more accurately controlled subsequent decontamination to take place or may also allow the item to be cut into one or more pieces some of which are substantially free from contamination and may thus be more easily disposed of.

The present invention aims to provide apparatus and methods for the monitoring of items for alpha contamination, and also to provide information relating to the position of the alpha contamination within or on the item. Systems for evaluating the position of other forms of contamination are also provided.

According to a first aspect of the invention we provide a system for monitoring alpha emitting sources on an item/location, the item/location being in contact with a medium, alpha emissions generating ions in the medium, the system comprising an instrument having a detecting chamber, the detecting chamber being provided with one or more electrodes for discharging ions, the instrument further being provided with means to monitor ions discharged on the electrode(s) to generate discharge with time data, the system being provided with means for moving the medium from in proximity to the item/location through the detecting chamber in a controlled manner, the discharge monitoring means monitoring the discharge occurring with time, the instrument being provided with processing means for converting the discharge with time data into alpha source position on the item/location data.

The item(s) to be monitored may be or include tools, pipes, pumps, filters, cables, beams, rods and the like, but particularly elongate items. The locations may include surfaces in general, such as floors, walls, ceilings, soil, rubble, material on a conveyor, and include parts of, or surfaces of items, such as glove boxes, tanks, vessels and the like.

Preferably the item is mounted or supported so as to maximise the surface area exposed, for instance to the medium flow.

The item or location may be introduced within the detecting chamber.

The item or location may be monitored in-situ. The item or location may be connected to the detecting chamber by medium conveying means, such as a pipe or conduit. The conveying means may be temporarily connected to the item or location. The conveying means may be provided as a part of the instrument. The conveying means, item or location and detecting chamber may define a closed circuit.

The medium may be a fluid, such as a liquid, but is preferably a gas. The gas may be a mixture, such as air, or may be in substantially single gas form, such as argon.

The detecting chamber may comprise an elongate chamber. The detecting chamber may have a circular or rectilinear cross-section.

The detecting chamber may be provided with an inlet and an outlet, the electrodes being provided between the inlet and the outlet. The inlet and/or outlet may connect to the surrounding environment for the instrument, for instance to give an open circuit instrument. The inlet and/or outlet may connect the instrument to the item or location, for instance through intermediate fluid conveying means, for instance to give a closed circuit.

Preferably means are provided within the system to remove extraneous ions and/or particulate matter. The ions and/or particles may be removed by a filter. A filter may be provided between downstream of the electrodes. The filter may, for instance be provided in the medium conveying means prior to the item or location. A filter is preferably provided in this way in a sealed system.

Particularly in an open system, a filter may be provided between the inlet from the surrounding environment and the item or location and/or detecting chamber. A filter may be provided between the detecting chamber and the outlet to the surrounding environment.

The detecting chamber may be openable to introduce or remove an item or location, for instance for an open circuit. The detecting chamber may comprise a sealable chamber, for instance for a closed circuit. The seal may be broken to make the chamber accessible to introduce and/or remove an item to be monitored.

Preferably the item or location is positioned upstream in the medium flow relative to the electrodes, where medium flow is used to move the ions.

The instrument may be provided with a single electrode. The instrument may be provided with a charged element or plate, such as an electret.

Preferably the detecting chamber is provided with a plurality of electrodes, the electrodes being spaced from one another. The electrodes may be configured with a first outer electrode and a second outer electrode and none or one or more intermediate electrodes provided there between.

The electrodes are preferably arranged parallel to the direction of medium flow. Preferably the medium flow passes through the spacing between the electrodes.

One or more, and preferably all, of the electrodes may be planar. Preferably the electrodes are provided parallel to one another. Preferably the electrodes are provided in opposition, for instance, an outer electrode being opposed by one electrode, an intermediate electrode being opposed by two electrodes. The spacing between the electrodes is preferably the same between each pair of opposing electrodes. The spacing between the outer electrodes and the detector chamber is preferably the same as between opposing electrodes.

The electrodes may be continuous, such as a plate, or discontinuous, such as a grid.

An applied, preferably externally generated, potential may be employed. The electrical potential is preferably provided by an external power source. An electrostatic potential may be employed, for instance from a charged plate or element, such as an electret.

Potentials of between 10 V and 1000 V may be provided.

The means for monitoring ions discharged and/or collected on the electrode(s) may comprise electrostatic charge monitoring means. More preferably the means for monitoring ions discharged on the electrode(s) comprise current indicating means and more preferably current measuring means. Preferably a single current measuring means is used. Preferably the combined current of all the electrodes connected to the current measuring means is measured. An electrometer, and most preferably a ground referenced electrometer is preferred for this purpose.

The means for moving the medium may comprise a piston provided in a bore in fluid connection with the detector chamber. The piston may be provided upstream or downstream of the detector chamber.

The means for moving the medium may be a fan. A removable obstruction to medium flow, such as a chopper or shutter, may be provided. The fan may be of controllable, and preferably of variable, speed. The electrodes may be provided between the medium moving means and the item or location, particularly for a fan.

The means for moving the medium may move the medium within a closed or open circuit.

The medium may pass over the item/location, pass the electrode(s) and then be returned upstream of the item/location. In a closed circuit the provision of means to remove ions, after passing the electrode(s) and prior to returning to the item/location is preferred.

The medium may pass over the item/location, pass the electrode(s) and be exhausted to the environment of the instrument. The medium is preferably filtered after passing the electrode(s) in such a case to remove particulate material. The medium may pass to a reservoir after passing the electrode(s).

The medium may be drawn from the environment prior to passing the item/location. Preferably in such a case the medium is filtered prior to passing the item/location to remove pre-existing ions.

The medium may be moved between the item/location and the electrodes such that laminar flow occurs, but non-laminar flow may be used. Preferably the medium is moved between the item/location and the electrode(s) such that the medium passes the electrode(s) in the same order as it passes the item/location.

One or more discrete flow paths over a surface or surfaces of the item or a location may be provided. A pipe, for instance, may have an external flow path separated from an internal flow path by the material forming the pipe. Preferably means are provided for regulating the medium flow along one or more of the discrete paths. Detection of alpha sources on or in one more of the discrete paths alone may be provided by obscuring or inhibiting one or more of the other flow paths. sealing means may be provided to inhibit flow along one or more of the flow paths, most preferably in a selective manner. Inflatable seals and/or iris seals and/or aperture seals may be provided.

The processing of discharge against time data to alpha source position data may be effected by equating the sequence of fluid passing the electrodes, and hence the sequence of the discharge signal, with the sequence of positions on the item/location the fluid passes. The process may equate the signal at a point in time with a position in the system from which the fluid will have moved in the elapsed time from fluid movement start. The relationship of time to position preferably incorporates a function representative of the fluid flowrate within the system.

Means may be provided for measuring the flowrate within the system, and particularly between the item/location and the electrodes.

Means may be provided for reversing the flow of medium through the system between monitoring runs. The medium flow means may be reversed in their direction. The connections between the detector chamber and the item/location may be reversed. The item/location may be reversed within the instrument.

One or more electrodes may be provided on both sides of the item/location. In one medium flow direction one of the electrode(s) may act as an ion filter and the other electrode(s) as the detectors, in the other medium flow direction the roles may be reversed.

According to a second aspect of the invention we provide a method for monitoring alpha emitting sources on an item/location, the method comprising contacting the item/location with a medium, alpha emissions generating ions in the medium, moving the medium to a detecting chamber provided in an instrument in a controlled manner, the detecting chamber being provided with one or more electrodes for discharging and/or collecting ions, the method further comprising monitoring ions discharged on the electrode(s) to give discharge against time data, the method including processing the discharge against time data to give alpha source position data.

The second aspect of the invention includes the features, options and possibilities set out elsewhere in this application, including the steps necessary to implement them.

The embodiments of the invention will now be described, by way of example only, and with reference to the accompanying drawings in which.

Items used in radioactive environments can potentially become contaminated with alpha and/or beta and/or gamma emitting sources. To monitor and potentially classify the level and type of contamination of an object it is therefore desirable to have as much information as possible about the type, level and position of contamination present.

Figure 1:
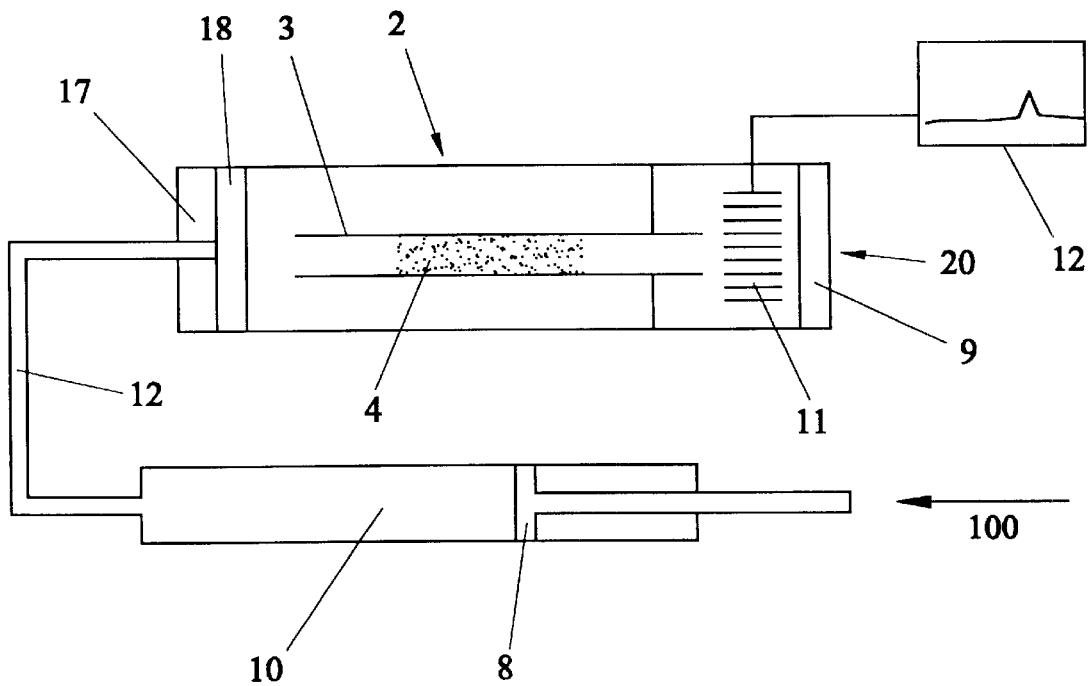
FIG. 1 is a schematic representation of an instrument according to a first aspect of the present invention.

FIG. 1 illustrates an instrument adapted to monitor alpha emission from an alpha source.

The apparatus comprises an elongate chamber 2 in which is positioned a pipe 3. The pipe 3 has somewhere within it a source of alpha emission 4, and the apparatus shown in FIG. 1 is designed to allow the level and position of the alpha activity to be determined.

The apparatus includes a piston 8 in a bore 10, the bore 10 being connected via tube 12 to an inlet end 17 of the chamber 2. The inlet end 17 is provided with a filter 19 through which all air entering the chamber 2 from the bore 10 passes. The filter 18 is intended to remove any ions in the air entering the chamber, whether these ions be generated by background sources, the rapid movement of the air through the bore 10 or through some other cause.

A second filter 9, such as a HEPA filter, is provided at the opposing outlet end 20.

In use, an item, in this case a pipe 3, having alpha activity is placed within the chamber 2 and left for a period of time, typically for about 1 to 10 seconds, to allow a cloud of ions to build-up from the alpha source 6. The pipe 3 is left for long enough to allow an equilibrium level of alpha activity to be established in the immediate location around the source 6 or sources. At the end of this period, the piston 8 is moved in the direction of arrow 100. This action drives a column of air into the chamber 2, passed the item 3 and through an ion detector unit 11. The advancement of the piston 8 is controlled to generate air flow past the item 3 and onto the detector unit 11.

As the air is forced through the chamber 2 the signal obtained from the ion detector unit is recorded by a data logger. A schematic graphic representation of the signal against time plot for a single source is shown in FIG. 1. The plot is shown in more detail in FIG. 3 and consists of background signal portion A and source including signal portion B corresponding to the spike.

In analysing the results the peak in ion emission level will be visible and will occur after a certain time has elapsed from the piston release and the consequent start of air movement.

The signal obtained may be adjusted to account for ions generated in the air, presented to the part of the item 3 closest to the inlet during the still air period, during its passage over the part of the item 3 nearer the detector unit 26. The peak signals obtained can be converted into levels and into positions by calibration information stored the apparatus.

The process may be repeated several times in order to ensure repeatability of the results and the positional information obtained. If several readings are taken, the data from each reading may be averaged. This will provide accurate information regarding the location of alpha activity.

Figure 2:
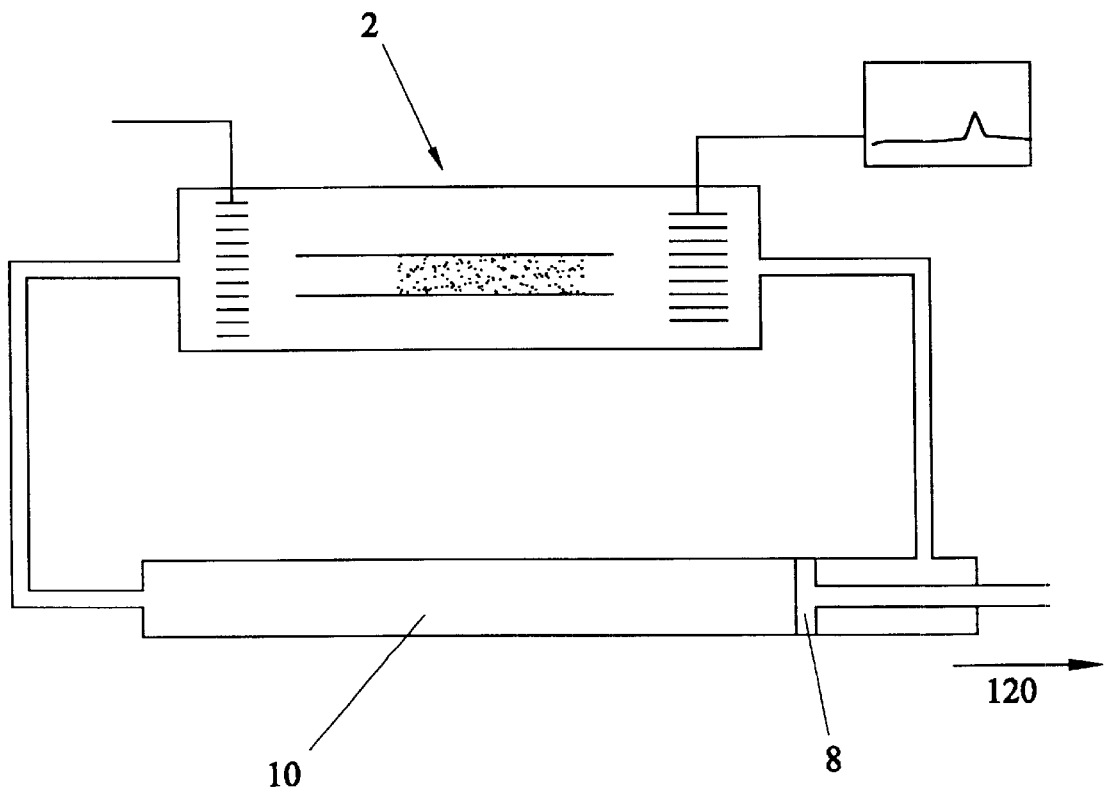
FIG. 2 illustrates an instrument according to a second aspect of the present invention.

Using the system illustrated in FIG. 2 air flow through the chamber 2 may be reversed by pulling the piston 8 back, direction 120, towards its starting position in the bore 10, thus drawing air through the chamber 2 in the opposing direction.

The method may be further implemented by using two ion detectors in the chamber 2, as illustrated. During air flow in a given direction the downstream detector unit would act as the ion detector whilst the upstream detector unit acts as an electrostatic ion filter to remove an ions present in the air fed to the system.

Figure 3:
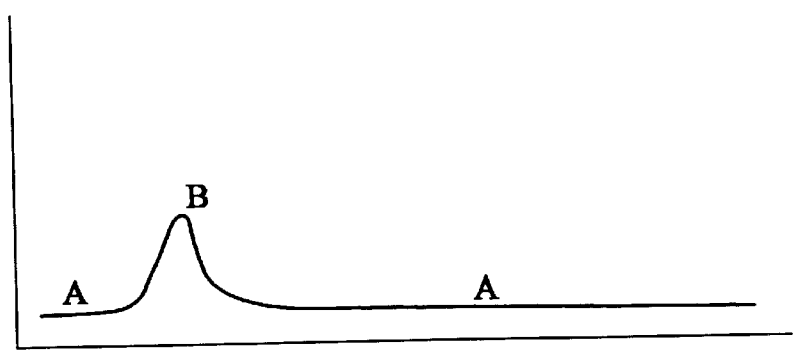
FIGS. 3 and 4 illustrate graphic information obtainable from either of the instruments shown in FIGS. 1 or 2.
Figure 4:
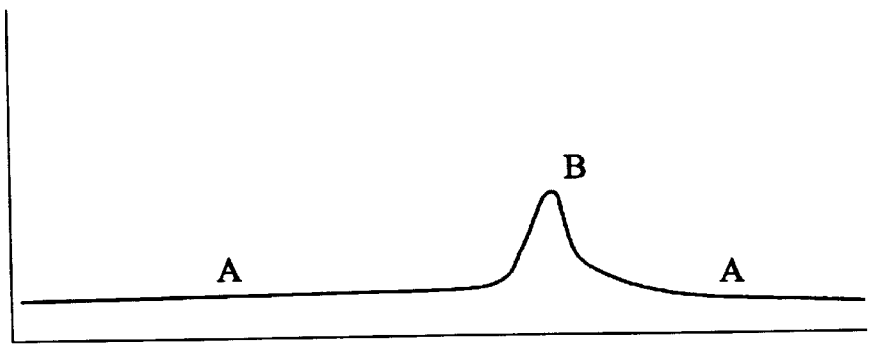

The data logger will plot output from the ion detector with the reverse air flow, and a graph similar to that shown at 12 in FIG. 3 will be produced. The ion emission peak in the second graph, FIG. 4, will occur at a different time, relative to the initial movement of the piston, to that of the ion emission peak in the first graph (provided the source is not at the mid point of the system) and a degree of corroboration of the positional information is thus achieved.

A similar effect can be obtained by rotating the item 4 being monitored through 108°, repositioning it and repeating the analysis.

As well as giving information about the specific location of discrete sources on the item under investigation the technique can also be used for other beneficial purposes. When disposing of contaminated items, particularly with regard to heavily contaminated materials, it is important to ensure that within any given amount of an item, following its cutting up or disassembly, that the level of radioactive material is below the determined threshold. Without positional information, this consideration involves the application of worst possible case evaluation. Thus it is assumed that the total contamination level measured is all present at one unknown location on the item. This can lead to very low amounts of the contaminated item being disposed of in a given storage volume. This significantly increases cost and would be unnecessary in many cases were more information available.

Figure 5:
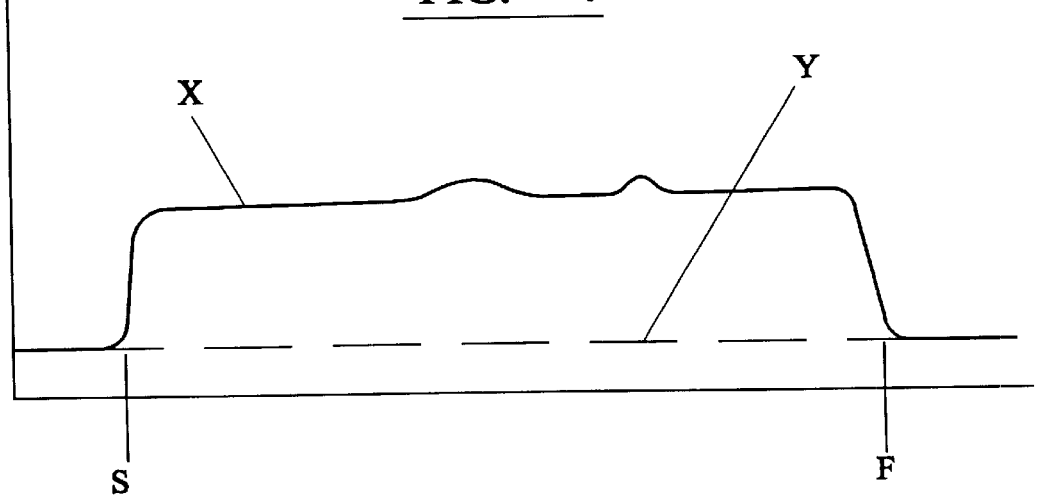
FIG. 5 illustrates a third embodiment of the invention.

An item, in this case a large item, such as a scaffold pole, is analysed using the technique set out above. The signal against time plot is illustrated in FIG. 5, as line X, together with a background signal which is obtained by running the technique without the item in-situ, line Y.

In this case the variation with time for the contamination indicating signal, line X, varies very little between the first air in contact with the pole reaching the detector unit, point S, and the last air contacting the pole reaching the detector unit, point F. This lack of variation confirms that for this unit that the contamination present is fairly evenly distributed over the pole. This means that the pole can be cut into a number of lengths reflecting this distribution and to meet the Waste disposal regulations. This is a far lower number of components than if the worse case scenario had to be assumed.

Figure 6:
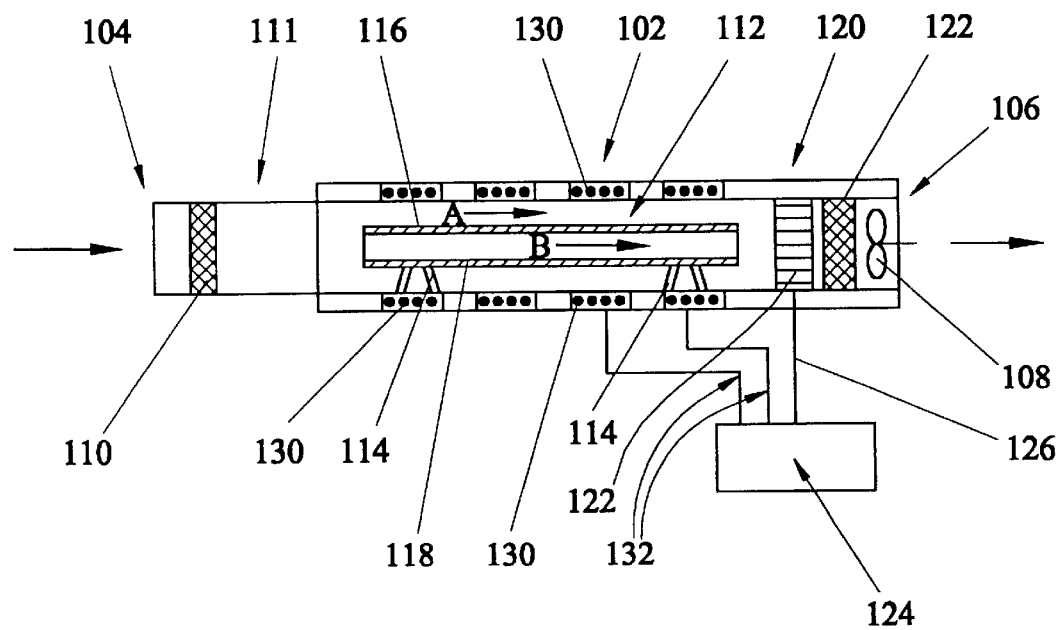
FIG. 6 illustrates a fourth embodiment of the invention.
Figure 7:
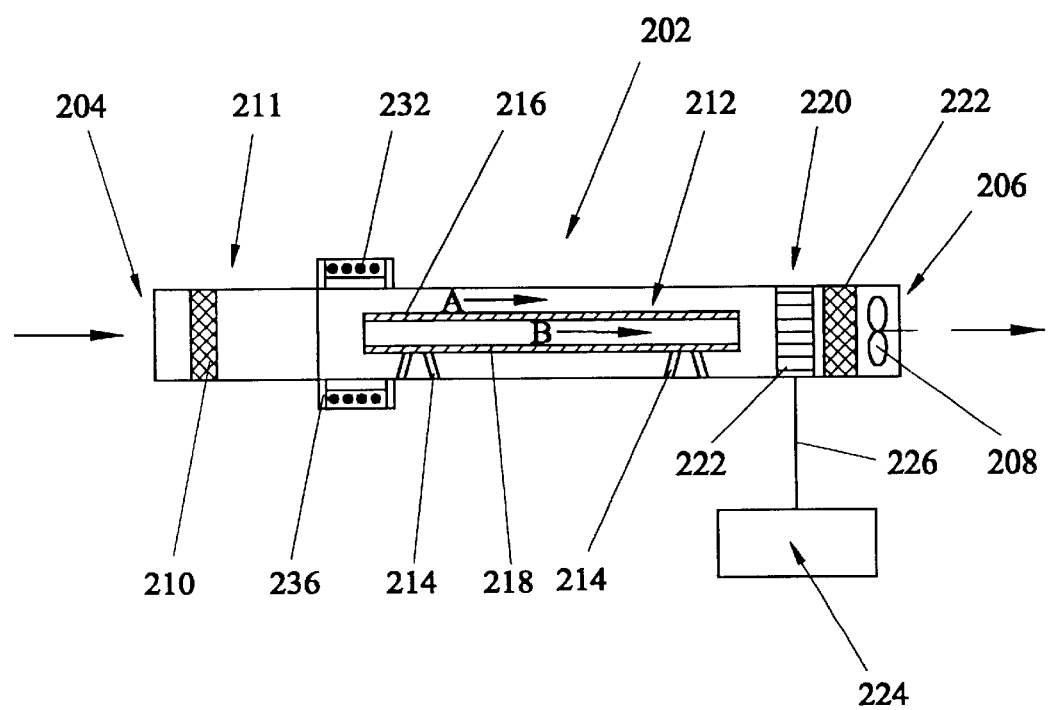
FIG. 7 illustrates a further embodiment of the invention.

In the alternative embodiments of the invention illustrated in FIGS. 6 and 7 the air is drawn through the apparatus by means of a fan 108;208 so as to give the positional information required for the sources.

In these instruments, however, the alpha position information is supplemented by beta and/or gamma position information.

In the instrument of FIG. 6 gamma detection is provided through a series of gamma detectors 130 along the length of the item 112 as well as around it, at the sides.

The signals from the individual detectors are fed to a preamplifier, amplifier and then to a single or multiple channel analyser to provide a total spectrum count rate. By monitoring the output from this plurality of gamma detectors 130 discretely more information can be obtained about the position of the gamma emissions detected relative to the item 112 in question can be obtained. This may, for instance, identify a single location of particularly high contamination which if removed from the item would allow the remainder of the item to be classified as a lower grade or free for release for re-use.

The flow path may be restricted to the inside or outside of the item by providing suitable sealing means for the other flowpath.

An even greater level of positional information for the gamma emission sources can be obtained using the embodiment of the instrument illustrated in FIG. 7. In this embodiment a number of gamma detectors 232 are mounted on a framework 236 which is mounted on the outside of the measuring chamber 202. The framework 236 can be moved up and down the length of the chamber 202, and as a consequence along the item 212 to be monitored to give highly positionally sensitive information about the gamma sources. The manner of the scanning of the item 212 is controlled by signals from the monitoring unit 224.

The framework 236 is illustrated with a plurality of gamma detectors on it, but a single gamma detector mounted on a frame which can be revolved around the measuring chamber 2 could equally be used.

As well as finding applications in specifically designed chambers into which the item to be analysed can be introduced the system also offers a technique for analysing items in-situ, where those items define a contained flow path. Thus it is possible to connect a section of pipe in-situ to a unit incorporating a detector and pass air down that pipe and into the detector unit. The circuit can be closed by attaching another part of the pipe to the other end of the detector unit. Suitable seals can be introduced to the pipe on the other sides of the inlet and outlet to control the flow.

Figure 8:
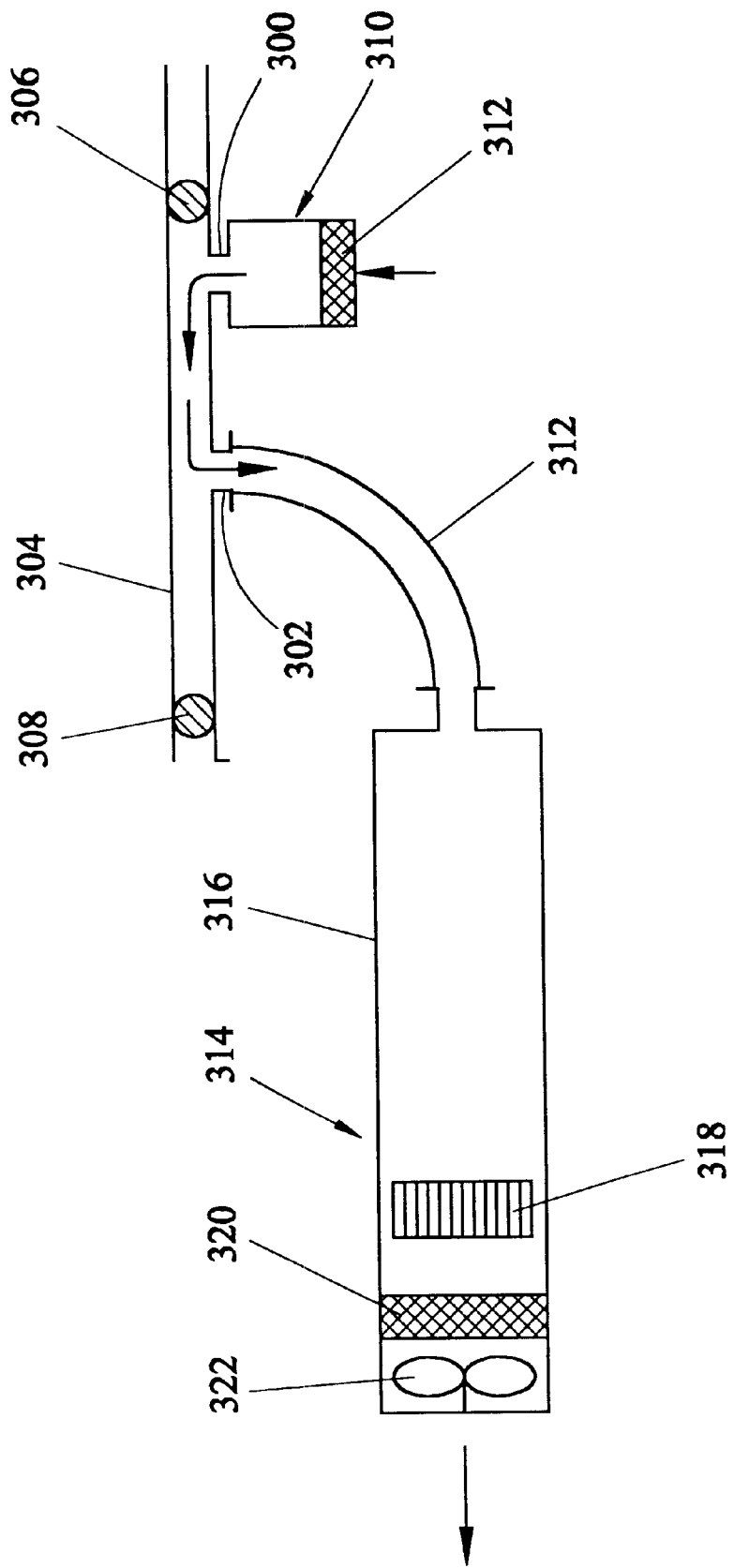
FIG. 8 illustrates a still further embodiment or the invention for use in in-situ monitoring.

Such a system is illustrated in FIG. 8. Here a section of pipe still in its position of use, in-situ, is monitored. An inlet into the pipe, 300, and an outlet from the pipe 302 are formed. Within the pipe 304, seals 306 and 308 are provided to define the flowpath. The provision of the seals in proximity to the inlet and outlet is preferred.

The inlet 300 is provided with an unit 310 which includes a HEPA filter 312 so as to remove any ions in the ambient air which would otherwise enter the pipe 304 and contribute to the signal.

The outlet 302 is connected via a suitable seal, such as a flange connection, to a pipe 312 which conveys the airflow from the pipe 304 to the instrument 314. The instrument consists of a chamber 316 into which the airflow is introduced, electrode based detection unit 318 and a filter 320 for removing particulate material from the exhaust air. Airflow through the in-situ location and the instrument is promoted by fan 322.

Ions are formed in the pipe 304 by contamination present therein and these ions are drawn into the instrument and discharged or collected at the electrode array 318 to give the measurable current.

What is claimed is:

1. A system for locating alpha emitting sources on an item/location, the system comprising:

an instrument having a detecting chamber, the detecting chamber being adapted to receive an item/location and a medium, an alpha emission source being located at a position on the item/location, the alpha emission source generating ions in the medium;

an electrode disposed within the detecting chamber, the electrode being configured to discharge the ions generated in the medium;

means for moving the medium from in proximity to the item/location through the detecting chamber in a controlled manner;

means for monitoring the ions discharged on the electrode over a time period so as to generate discharge-against-time data; and processing means for determining the position of the alpha emission source on the item/location based on the discharge-against-time data.

2. A system according to claim 1 in which the processing means comprises equating the sequence of medium passing the electrode, and hence the sequence of the discharge signal, with the sequence of positions on the item/location the medium passes.

3. A system according to claim 2 in which the processing means equates the signal at a point in time with a position in the system from which the medium will have moved in the elapsed time from medium movement start.

4. A system according to claim 1 further comprising means for measuring the medium flowrate within the system.

5. A system according to claim 1 in which the item/location is monitored in-situ.

6. A system according to claim 1 in which the means for moving the medium comprises a piston provided in a bore in fluid connection with the instrument.

7. A system according to claim 1 in which the means for moving the medium comprises a fan.

8. A system according to claim 1 in which the housing is configured such that medium passes over the item/location, past the electrode and is then returned upstream of the item/location.

9. A system according to claim 1 in which the housing is configured such that medium passes over the item/location, past the electrode and is then exhausted to the environment of the instrument.

10. A system according to claim 1 further comprising means for reversing the flow of medium through the system between monitoring runs.

11. A system according to claim 1 in which one or more electrodes are provided on both sides of the item/location such that in one medium flow direction one of the electrode(s) acts as an ion filter and the other electrode(s) acts as the detector, in the other medium flow direction the roles being reversed.

12. A system according to claim 1 in which the means for monitoring ions discharged on the electrode comprises an electrostatic charge monitor.

13. A system according to claim 1 in which the means for monitoring ions discharged on the electrode comprises a current measurer.

14. A method for monitoring alpha emitting sources on an item/location, the method comprising:

contacting the item/location with a medium, an alpha emission source being located at a position on the item/location, the alpha emission source generating ions in the medium;

moving the medium in a detecting chamber provided in an instrument in a controlled manner, the detecting chamber being provided with an electrode for discharging ions;

monitoring the ions discharged on the electrode over a given time period so as to obtain discharge-against-time data; and determining the position of the alpha emission source on the item/location based on the discharge-against-time data.

15. A method according to claim 14, further comprising measuring the flowrate of the medium.

16. A method according to claim 14, in which the item/location is monitored in-situ.

17. A method according to claim 14, further comprising passing the medium over the item/location, past the electrode, and then returning the medium upstream of the item/location.

18. A method according to claim 14, further comprising passing the medium over the item/location, past the electrode, and then exhausting the medium to the environment.

19. A method according to claim 14, further comprising reversing the flow of the medium through the detection chamber.

* * * * *

UNITED STATES PATENT AND TRADEMARK OFFICE
CERTIFICATE OF CORRECTION

PATENT NO.      : 6,365,901 B1                                                Page 1 of 1
DATED           : April 2, 2002
INVENTOR(S)     : Christopher Henry Orr et al.

It is certified that error appears in the above-identified patent and that said Letters Patent is hereby corrected as shown below:

<u>Title page,</u>
Item [57], ABSTRACT,
Line 8, before "in proximity" change "frog" to -- from --

<u>Column 4,</u>
Line 7, after "flow paths." change "sealing" to -- Sealing --
Line 62, after "invention;" delete "and"
Line 66, after "embodiment" change "or" to -- of --

<u>Column 5,</u>
Line 17, after "filter" change "19" to -- 18 --
Line 56, after "stored" and before "the" insert -- in --

<u>Column 6,</u>
Line 17, after "through" change "108" to -- 180 --
Line 51, before "disposal" change "Waste" to -- waste --

<u>Column 7,</u>
Line 34, after "introduced" insert -- , --

<u>Column 8,</u>
Line 44, after "such that" and before "medium" insert -- the --
Line 48, after ""such that" and before "medium" insert -- the --

Signed and Sealed this

First Day of April, 2003

JAMES E. ROGAN
*Director of the United States Patent and Trademark Office*